US011949852B2

United States Patent
Lin et al.

(10) Patent No.: US 11,949,852 B2
(45) Date of Patent: Apr. 2, 2024

(54) METHOD AND APPARATUS OF RESIDUAL CODING SELECTION FOR LOSSLESS CODING MODE IN VIDEO CODING

(71) Applicant: HFI Innovation Inc., Zhubei (TW)

(72) Inventors: Zhi-Yi Lin, Hsinchu (TW); Tzu-Der Chuang, Hsinchu (TW); Ching-Yeh Chen, Hsinchu (TW)

(73) Assignee: HFI INNOVATION INC., Zhubei (TW)

( * ) Notice: Subject to any disclaimer, the term of this patent is extended or adjusted under 35 U.S.C. 154(b) by 0 days.

(21) Appl. No.: 17/641,645

(22) PCT Filed: Sep. 16, 2020

(86) PCT No.: PCT/CN2020/115481
§ 371 (c)(1),
(2) Date: Mar. 9, 2022

(87) PCT Pub. No.: WO2021/052348
PCT Pub. Date: Mar. 25, 2021

(65) Prior Publication Data
US 2022/0272322 A1    Aug. 25, 2022

Related U.S. Application Data

(60) Provisional application No. 62/929,156, filed on Nov. 1, 2019, provisional application No. 62/902,433, filed on Sep. 19, 2019.

(51) Int. Cl.
*H04N 19/105*    (2014.01)
*H04N 19/176*    (2014.01)
(Continued)

(52) U.S. Cl.
CPC ......... *H04N 19/105* (2014.11); *H04N 19/176* (2014.11); *H04N 19/186* (2014.11); *H04N 19/70* (2014.11)

(58) Field of Classification Search
CPC .... H04N 19/44; H04N 19/103; H04N 19/176; H04N 19/50
See application file for complete search history.

(56) References Cited

U.S. PATENT DOCUMENTS 10,575,000 B2    2/2020    Wu et al.
10,623,773 B2    4/2020    Chen et al.
(Continued)

FOREIGN PATENT DOCUMENTS

CN    105493507 A    4/2016
CN    106878751 A    6/2017
(Continued)

OTHER PUBLICATIONS

"DPCM-Based Edge Prediction for Lossless Screen Content Coding in HEVC" —Victor Sanchez, Francesc Aulí-Llinàs, and Joan Serra-Sagristà; IEEE Journal On Emerging and Selected Topics in Circuits and Systems, vol. 6, No. 4, Dec. 2016 (Year: 2016).*
(Continued)

*Primary Examiner* — Mainul Hasan
(74) *Attorney, Agent, or Firm* — McClure, Qualey & Rodack, LLP (57) ABSTRACT

A method and apparatus of video coding, where according to one method, input data related to a current block in a current picture are received at a video encoder side or compressed data comprising the current block are received at a video decoder side. A first syntax at a high level in a video bitstream regarding residual coding type is signaled at the encoder side or parsed at the decoder side. A target coding mode is determined for the current block based on information comprising a value of the first syntax. The current block is encoded at the encoder side or decoded at
(Continued)

the decoder side according to the target coding mode. The high level may correspond to a slice header or a picture header.

14 Claims, 2 Drawing Sheets

(51) Int. Cl.
*H04N 19/186* (2014.01)
*H04N 19/70* (2014.01)

(56) References Cited

U.S. PATENT DOCUMENTS

| | | | |
|---|---|---|---|
| 2014/0226721 A1* | 8/2014 | Joshi | H04N 19/176 |
| | | | 375/240.12 |
| 2014/0362917 A1* | 12/2014 | Joshi | H04N 19/129 |
| | | | 375/240.12 |
| 2017/0230687 A1 | 8/2017 | Chen et al. | |
| 2021/0385439 A1* | 12/2021 | Zhu | H04N 19/61 |
| 2022/0070461 A1* | 3/2022 | Zhang | H04N 19/70 |
| 2022/0174280 A1* | 6/2022 | Zhang | H04N 19/50 |

FOREIGN PATENT DOCUMENTS

| | | | | |
|---|---|---|---|---|
| CN | 107040785 A | 8/2017 | | |
| CN | 107454414 A | 12/2017 | | |
| CN | 108632611 A | 10/2018 | | |
| WO | 2019/000362 A1 | 1/2019 | | |
| WO | WO-2020264457 A1 * | 12/2020 | | H04N 19/124 |
| WO | WO-2021034100 A1 * | 2/2021 | | |

OTHER PUBLICATIONS

International Search Report and Written Opinion dated Dec. 17, 2020, issued in application No. PCT/CN2020/115481.
Chinese language office action dated Dec. 30, 2021, issued in application No. TW 109132058.
Chen, L., et al.; "AHG17: Control of transform skip residual coding;" Joint Video Experts Team (JVET) of ITU-T SG 16 WP 3 and ISO/IEC JTC 1/SC 29/WG 11; Jul. 2019; pp. 1-6.
Chinese language office action dated Apr. 29, 2023, issued application No. CN 202080057138.9.
Extended European Search Report dated Aug. 11, 2023, issued in application No. EP 20864817.0.
Chen, J., et al.; "Algorithm description for Versatile Video Coding and Test Model 6 (VTM 6);" Joint Video Experts Team (JVET) of ITU-T SG 16 WP 3 and ISO/IEC JTC 1/SC 29/WG 11; Sep. 2019; pp. 1-89.
Flynn, D., et al.; "High Efficiency Video Coding (HEVC) Range Extensions text specification: Draft 7;" Joint Collaborative Team on Video Coding (JCT-VC) of ITU-T SG 16 WP 3 and ISO/IEC JTC 1/SC 29/WG 11; Jun. 2014; pp. 1-352.

* cited by examiner

METHOD AND APPARATUS OF RESIDUAL CODING SELECTION FOR LOSSLESS CODING MODE IN VIDEO CODING

CROSS REFERENCE TO RELATED APPLICATIONS

The present invention claims priority to U.S. Provisional Patent Application, Ser. No. 62/902,433, filed on Sep. 19, 2019 and U.S. Provisional Patent Application, Ser. No. 62/929,156, filed on Nov. 1, 2019. The U.S. Provisional Patent Applications are hereby incorporated by reference in their entireties.

TECHNICAL FIELD

The present invention relates to block based DPCM (BDPCM) prediction for video coding. In particular, the present invention relates to techniques to improve the efficiency of BDPCM.

BACKGROUND

High-Efficiency Video Coding (HEVC) is a new international video coding standard developed by the Joint Collaborative Team on Video Coding (JCT-VC). HEVC is based on the hybrid block-based motion-compensated DCT-like transform coding architecture. The basic unit for compression, termed coding unit (CU), is a 2N×2N square block, and each CU can be recursively split into four smaller CUs until the predefined minimum size is reached. Each picture can be partitioned into multiple CTUs (Coding Tree Units) and each CTU is partitioned one or more CUs. For color video data, each CU may comprise multiple Coding Blocks (CBs) corresponding to multiple color components. Each CU contains one or multiple prediction units (PUs). For color video data, each PU may comprise multiple Prediction Blocks (PBs) corresponding to multiple color components. To achieve the best coding efficiency of hybrid coding architecture in HEVC, there are two kinds of prediction modes (i.e., Intra prediction and Inter prediction) for each PU. For Intra prediction modes, the spatial neighboring reconstructed pixels can be used to generate the directional predictions.

After the development of HEVC standard, another merging video coding standard, named as Versatile Video Coding (VVC), is being developed under Joint Video Exploration Team (WET) of ITU-T SG 16 WP 3 and ISO/IEC JTC 1/SC 29/WG 11. Various new coding tools along with some existing coding tools have been evaluated for VVC.

Block DPCM (BDPCM) is a new coding tool included in VVC. BDPCM (Block Differential Pulse Coded Modulation or Block-based Delta Pulse Code Modulation), which is also called RDPCM (Residual Block-Differential Pulse Coded Modulation), method proposed in JVET-M0057 (F. Henry, et al., "CE8: BDPCM with horizontal/vertical predictor and independently decodable areas (test 8.3.1b)", Joint Video Experts Team (JVET) of ITU-T SG 16 WP 3 and ISO/IEC JTC 1/SC 29/WG 11, 13th Meeting: Marrakech, Mass., 9-18 Jan. 2019, Document: WET-M0057) uses reconstructed samples to predict the rows or columns line by line. VVC supports BDPCM for screen content coding. At the sequence level, a BDPCM enable flag is signaled in the SPS (Sequence Parameter Set); this flag is signaled only if the transform Skip mode is enabled in the SPS. When BDPCM is enabled, a flag is signaled at the CU level if the CU size is smaller than or equal to MaxTsSize by MaxTsSize in terms of luma samples and if the CU is Intra coded, where MaxTsSize is the maximum block size for which the transform Skip mode is allowed. This flag indicates whether regular Intra coding or BDPCM is used. If BDPCM is used, a BDPCM prediction direction flag is signaled to indicate whether the prediction is horizontal or vertical.

Then, the block is predicted using the regular horizontal or vertical Intra prediction process with unfiltered reference samples. The residual is quantized and the difference between each quantized residual and its predictor, i.e. the previously coded residual of the horizontal or vertical (depending on the BDPCM prediction direction) neighbouring position, is coded.

In VTM-5.0 (J. Chen, et al., "Algorithm description for Versatile Video Coding and Test Model 5 (VTM 5)", Joint Video Experts Team (JVET) of ITU-T SG 16 WP 3 and ISO/IEC JTC 1/SC 29/WG 11, 14th Meeting: Geneva, CH, 19-27 Mar. 2019, Document: JVET-N1002), the block DPCM mode is adopted for screen content video coding. When the current CU is Intra coded CU, a flag, intra_bdpcm_flag, is signaled to indicate whether the BDPCM is applied or not. If the intra_bdpcm_flag is true, a BDPCM prediction direction flag, intra_bdpcm_dir_flag is signaled to determine whether the prediction direction is horizontal direction (i.e., intra_bdpcm_dir_flag equal to 0) or is vertical direction (i.e., intra_bdpcm_dir_flag equal to 1). When BDPCM mode is applied, not only the Intra prediction of horizontal or vertical mode is applied, the horizontal or vertical direction DMCP is also applied for the residual coefficients after quantization and before quantization. The BDPCM is only applied for luma component.

SUMMARY

A method and apparatus of video coding are disclosed. According to this method, input data related to a current block in a current picture are received at a video encoder side or compressed data comprising the current block are received at a video decoder side. A first syntax at a high level in a video bitstream regarding residual coding type is signaled at the encoder side or parsed at the decoder side. A target coding mode is determined for the current block based on information comprising a value of the first syntax. The current block is encoded at the encoder side or decoded at the decoder side according to the target coding mode. The high level may correspond to a slice header or a picture header.

In one embodiment, the first syntax indicates the residual coding type of transform skip blocks or the residual coding type of DPCM blocks. Furthermore, the residual coding type is transform skip coefficient coding or regular coefficient coding, and the first syntax indicates whether transform skip coefficient coding or regular coefficient coding is used. In another embodiment, the first syntax comprises two independent residual coding type flags for a luma component and a chroma component, respectively.

In one embodiment, while the first syntax is signaled to indicate residual coding type of transform skip blocks, a separate syntax is signaled to indicate residual coding type of DPCM blocks. In another embodiment, the first syntax is signaled or parsed regardless of a second syntax indicating transform skip coefficient coding mode being true or false, the second syntax being signaled for the current block.

DETAILED DESCRIPTION OF PREFERRED IMPLEMENTATIONS

The following description is of the best-contemplated mode of carrying out the invention. This description is made for the purpose of illustrating the general principles of the invention and should not be taken in a limiting sense. The scope of the invention is best determined by reference to the appended claims.

InVTM-5.0, the BDPCM is only applied for luma component for the CU with size smaller than or equal to 32×32. In one embodiment, the intra_bdpcm_flag can be signaled when lossless mode is enabled or when cu_transquant_bypass_flag is enabled, even when the CU size is larger than 32, or 64, or maximum TU size. For example, the syntax can be modified as shown in Table 1 or Table 2.

TABLE 1

```
if( treeType = = SINGLE_TREE || treeType = = DUAL_TREE_LUMA ) {
   if( (cbWidth <= 32 && cbHeight <= 32) || cu_transquant_bypass_flag )
      intra_bdpcm_flag[ x0 ][ y0 ]                                    ae(v)
   if( intra_bdpcm_flag[ x0 ][ y0 ] )
      intra_bdpcm_dir_flag[ x0 ][ y0 ]                                ae(v)
```

TABLE 2

```
if( treeType = = SINGLE_TREE || treeType = = DUAL_TREE_LUMA ) {
   if( (cbWidth <= 32 && cbHeight <= 32) ||
(cu_transquant_bypass_flag&&cbWidth<= 64 &&cbHeight<= 64) )
      intra_bdpcm_flag[ x0 ][ y0 ]                                    ae(v)
   if( intra_bdpcm_flag[ x0 ][ y0 ] )
      intra_bdpcm_dir_flag[ x0 ][ y0 ]                                ae(v)
```

In the above Tables, the modified texts are shown in italics.

In one embodiment, when the BDPCM is enabled (e.g. intra_bdpcm_flag is true), the BDPCM is also applied to chroma components. The luma and chroma component share the same BDPCM syntaxes.

In another embodiment, the BDPCM mode can be applied for chroma components when lossless mode is enabled or when cu_transquant_bypass_flag is enabled. The Intra prediction mode/direction is equal to vertical or horizontal for chroma CB if intra_bdpcm_dir_flag is equal to 1 or 0, or equal to 0 or 1. The residual coding with DPCM is also coded with vertical or horizontal direction DPCM for chroma residual. In one embodiment, when cu_transquant_bypass_flag is disabled, the BDPCM is only applied for luma component if intra_bdpcm_flag is true, and when cu_transquant_bypass_flag is enabled, the BDPCM is applied for luma and chroma components if intra_bdpcm_flag is true.

In another embodiment, the BDPCM can be applied for chroma component. One or more individual chroma BDPCM syntaxes can be signaled or parsed to indicate whether the BDPCM is applied to the chroma component or not. The chroma BDPCM syntaxes are not shared with the luma component. When the chroma BDPCM is applied, the BDPCM direction is also signaled or parsed. The Intra prediction mode/direction is equal to vertical or horizontal for chroma CB if chroma intra_bdpcm_dir_flag is equal to 1 or 0, or equal to 0 or 1. The residual coding with DPCM is also coded with vertical or horizontal direction DPCM for the chroma residual. The chroma BDPCM is applied for the chroma Intra CU. The syntax can be inserted before the CCLM (Cross-Component Linear Mode) syntax and regular chroma Intra mode syntax, which is shown as follow. If the chroma BDPCM is applied, the syntaxes of CCLM and regular chroma Intra mode are skipped. The chroma Intra prediction is set to some predefined values or derived values (e.g. horizontal or vertical direction) according to the chroma intra_bdpcm_dir_flag.

TABLE 3

```
if( ( treeType = = SINGLE_TREE || treeType = = DUAL_TREE_CHROMA ) &&
    ChromaArrayType != 0 ) {
    if ( pred_mode_plt_flag&&treeType = = DUAL_TREE_CHROMA )
        palette_coding( x0, y0, cbWidth / SubWidthC, cbHeight / SubHeightC, 1, 2 )
    else {
        if( sps_bdpcm_enabled_flag && sps_chroma_bdpcm_enabled_flag
        cbWidth <= MaxTsSize && cbHeight <= MaxTsSize )
            chroma_intra_bdpcm_flag                                          ae(v)
        if( chroma_intra_bdpcm_flag )
            chroma_intra_bdpcm_dir_flag                                      ae(v)
    else {
        if( CclmEnabled )
            cclm_mode_flag                                                   ae(v)
        if( cclm_mode_flag )
            cclm_mode_idx                                                    ae(v)
        else
            intra_chroma_pred_mode                                           ae(v)
}
    }
```

Again, the modified texts are shown in italics in the above Table. The chroma BDPCM mode can be applied only when lossless mode is enabled or when cu_transquant_bypass_flag is enabled. For example, the cu_transquant_bypass_flag can be in the enabling condition.

TABLE 4

```
if( sps_bdpcm_enabled_flag && sps_chroma_bdpcm_enabled_flag
&&cu_transquant_bypass_flag&&cbWidth <= MaxTsSize && cbHeight <= MaxTsSize )
    chroma_intra_bdpcm_flag                                                  ae(v)
```

One or more sequence/picture/slice/tile/tile-group/brick/SPS/PPS (Picture Parameter Set)/APS (Adaptation Parameter Set)-level syntaxes of chroma BDPCM enable flag can be signaled or parsed. The chroma BDPCM mode cannot be applied when the high-level syntax indicates that the chroma BDPCM is disabled.

In another embodiment, the BDPCM mode can be applied for chroma components in chroma CU when dual tree is enabled and when lossless mode is enabled or when cu_transquant_bypass_flag is enabled. For example, the syntax can be modified as shown in Table 5 or Table 6. In another embodiment, the chroma DPCM can also be applied for single tree and dual tree.

TABLE 5

```
if( treeType = = SINGLE_TREE || treeType = = DUAL_TREE_LUMA || (treeType
= = DUAL_TREE_LUMA &&cu_transquant_bypass_flag) ) {
    if( (cbWidth <= 32 && cbHeight <= 32) || cu_transquant_bypass_flag )
        intra_bdpcm_flag[ x0 ][ y0 ]                                         ae(v)
    if( intra_bdpcm_flag[ x0 ][ y0 ] )
        intra_bdpcm_dir_flag[ x0 ][ y0 ]                                     ae(v)
```

TABLE 6

```
if( treeType = = SINGLE_TREE || treeType = = DUAL_TREE_LUMA || (treeType
= = DUAL_TREE_LUMA &&cu_transquant_bypass_flag)) {
    if( (cbWidth <= 32 && cbHeight <= 32) ||
(cu_transquant_bypass_flag&&cbWidth<= 64 &&cbHeight<= 64) )
        intra_bdpcm_flag[ x0 ][ y0 ]                                         ae(v)
    if( intra_bdpcm_flag[ x0 ][ y0 ] )
        intra_bdpcm_dir_flag[ x0 ][ y0 ]                                     ae(v)
```

In another embodiment, the chroma BDPCM can be implicitly applied when the lossless mode is applied (e.g. when cu_transquant_bypass_flag is true) and the chroma Intra prediction mode is equal to horizontal or vertical direction. The horizontal or vertical direction residual DPCM is applied. This function can be enabled in sequence/picture/slice/tile/tile-group/brick/SPS/PPS/APS-level through a high-level syntax.

In another embodiment, in order to improve the lossless mode coding efficiency in Inter slice, the BDPCM can be also applied when the CU is coded in Inter mode or non-Intra mode (e.g. Inter mode and Intra BC mode). The Inter mode BDPCM can be applied for every CU size or the CU size can be constrained to be smaller than a predefined/signaled size or larger than predefined/signaled size. The inter_bdpcm_flag and the inter_bdpcm_dir_flag can be signaled for non-Skip Inter mode coded CU (e.g. Merge mode or AMVP/Inter mode). When the inter_bdpcm_flag is true, the residual is coded with vertical or horizontal direction DPCM depending on the inter_bdpcm_dir_flag (e.g., 0 for horizontal direction and 1 for vertical direction). In one embodiment, the residual DMCM or BDPCM is applied on the luma component only. In another embodiment, the residual DMCM or BDPCM is applied on both the luma and chroma components. In another embodiment, the Inter BDPCM is only applied when the lossless mode is enabled or when cu_transquant_bypass_flag is enabled, or when the slice/picture/tile/tile group/brick/sequence-level lossless or transquant bypass mode is applied. In another embodiment, the BDPCM can also be applied to components when lossless mode is enabled or when cu_transquant_bypass_flag is enabled. When the lossless mode or cu_transquant_bypass_flag is enabled, the BDPCM mode can be applied to reduce the redundancy between the adjacent coefficients. The BDPCM can be applied in non-Intra mode residual coding (e.g. Inter mode or Intra Block Copy mode) when the lossless mode or cu_transquant_bypass_flag is enabled. The bdpcm_flag and bdpcm_dir can be signaled. If the BDPCM is applied in non-Intra mode, the residual level DPCM is performed. For example, the residual DPCM is performed before inverse quantization and inverse transform. The BDPCM can also be applied to the chroma component.

The Inter/IBC (Inter Block Copy) residual BDPCM syntax can be signaled in TU-level when one or more color components have at least one non-zero coefficient. In another example, the Inter/IBC residual BDPCM syntax can be signaled/parsed in TB-level when the current coded color component has at least one non-zero coefficient. In another example, the Inter/IBC residual BDPCM syntax can be signaled/parsed in TB-level for the luma component when the current coded luma component has at least one non-zero coefficient. In another example, the Inter/IBC residual BDPCM syntax can be signaled/parsed in CU-level when the TU/TBs in the current CU has at least one non-zero coefficient. For example, the Inter/IBC residual BDPCM syntax can be signaled after the root_cbf when the root_cbf is not zero. The root_cbf corresponds to the coded block flag that indicates whether there is at least one non-zero coefficient in the current block, including luma component and chroma components. The syntax or Inter/IBC BDPCM can be constraint with CU/TU/TB size. For example, it is only signaled/parsed/applied when the current CU or TU or TB size is smaller than a threshold and/or larger than a threshold. For example, it is only signaled/parsed/applied when the current CU or TU or TB size is smaller than the maximum TB size of each color component.

In another embodiment, to improve the coding efficiency, when BDPCM is applied, the regular residual coding (non-transform-skip residual coding) is applied for the residual coefficient coding. In another embodiment, to improve the coding efficiency in lossless mode, when lossless mode is applied (or cu_transquant_bypass_flag is 1), the regular residual coding (i.e., non-transform-skip residual coding) is applied for the residual coefficient coding in BDPCM mode. When the lossless mode is not applied (or cu_transquant_bypass_flag is 0), the transform-skip residual coding is applied for the BDPCM mode coding. In another embodiment, one or more sequence/picture/slice/tile/tile-group/brick/SPS/PPS/APS-level syntaxes can be used to determine which kind of residual coefficient coding method (e.g., regular or transform-skip coefficient coding) is used for BDPCM mode regardless the lossless mode is applied or not. In another embodiment, one or more sequence/picture/slice/tile/tile-group/brick/SPS/PPS/APS-level syntaxes can be used to determine which kind of residual coefficient coding method (e.g., regular or transform-skip coefficient coding) is used for BDPCM mode in the lossless mode. If the CU is not coded in lossless mode (e.g., cu_transquant_bypass_flag equal to 0), the transform-skip residual coding is applied for the BDPCM mode coding.

In another embodiment, when the lossless mode is enabled or when cu_transquant_bypass_flag is enabled, the coefficient coding uses the transform Skip coefficient coding. In another embodiment, when the lossless mode is enabled or when cu_transquant_bypass_flag is enabled, the coefficient coding uses the non-transform Skip coefficient coding. In another embodiment, when the lossless mode is enabled or when cu_transquant_bypass_flag is enabled, the transform Skip mode flag is still signaled. The coefficient coding uses the non-transform Skip coefficient coding if the transform Skip mode flag is false; and the coefficient coding uses the transform Skip coefficient coding if the transform Skip mode flag is true. The transform Skip flag is used to select the residual coding method. In one embodiment, the transform Skip flag can be signaled in TB-level, TU-level, or CU-level. If it is signaled in TB-level, the transform Skip flag is signaled when the cbf (coded block flag) of the color component is true. In one example, when the BDPCM is enabled (including the luma BDPCM and/or the chroma BDPCM), the transform Skip flag is inferred as 1. In another embodiment, when the BDPCM is enabled (including the luma BDPCM and/or the chroma BDPCM), the transform Skip flag is still signaled/parsed. The signaled/parsed flag is used to select the residual coding method of the BDPCM coded block. In another example, when the BDPCM is enabled, the transform Skip flag is not signaled. The regular coefficient coding is applied for the BDPCM coded block.

In another embodiment, for the BDPCM coded block, one or more sequence/picture/slice/tile/tile-group/brick/SPS/PPS/VPS/picture-header or APS-level syntaxes are signaled/parsed to determine which kind of coefficient coding method is applied for the BDPCM mode and/or the chroma BDPCM mode. For example, a pps_bdpcm_residual_coding_flag can be signaled in PPS or a sps_bdpcm_residual_coding_flag can be signaled in SPS to indicate whether the regular coefficient coding method or transform Skip coefficient coding method is used for BDPCM and/or chroma BDPCM mode.

The coding mode of chroma BDPCM mode can be signaled independently. For example, if chroma BDPCM is enabled, the pps_bdpcm_chroma_residual_coding_flag and/or sps_bdpcm_chroma_residual_coding_flag are signaled. This kind of syntax is not signaled/parsed when the BDPCM is not applied/enabled. In another example, this kind of syntax is not signaled/parsed when the BDPCM is not applied/enabled or when the transform Skip mode is not applied. In another example, this kind of syntax is not signaled/parsed when the BDPCM is not applied/enabled or when the transform Skip mode is not applied or when the transquant bypass mode is not applied.

In another embodiment, the coding mode selection syntax of BDPCM and/or chroma BDPCM can be signaled in sequence/picture/slice/tile/tile-group/brick/SP S/PP S/picture-header or APS-level without knowing whether the BDPCM or chroma BDPCM tool is enabled or not. For example, the pps_bdpcm_residual_coding_flag and/or pps_bdpcm_chroma_residual_coding_flag can be signaled in PPS, or the slice_bdpcm_residual_coding_flag and/or slice_bdpcm_chroma_residual_coding_flag can be signaled in slice header even when the BDPCM is disabled in SPS. It can be signaled when sps_bdpcm_enabled_flag and/or sps_bdpcm_chroma_enabled_flag are false. It prevents the syntax signaling dependency between PPS/slice-header and SPS.

In another embodiment, the coefficient method selection for BDPCM is enabled when the cu_transquant_bypass_flag is enabled. If the cu_transquant_bypass_flag is not enabled, the transform Skip mode coding is applied. In another embodiment, the high-level syntax of coefficient method selection for BDPCM is signaled/parsed when the cu_transquant_bypass_flag is allowed to be signaled (e.g. transquant bypass enabled flag being true). If the high-level syntax of coefficient method selection for BDPCM is not signaled/parsed, the transform Skip mode coding is applied.

In another embodiment, the high-level syntax of coefficient method selection for BDPCM is signaled/parsed when the BDPCM is enabled and the transform Skip mode is enabled. In another example, another syntax can be used to select the coefficient coding method. For example, one syntax (or one flag), residual_coding_type, is signaled/parsed to select the coefficient coding method. If the flag is 1 (or 0), the non-transform Skip coefficient coding is used. Otherwise (i.e., the flag equal to 0 (or 1)), the transform Skip coefficient coding is used. The residual_coding_type can be signaled when the cu_transquant_bypass_flag is true or when the entire slice/tile/brick/sequence/picture uses transquant bypass coding. In another example, the residual_coding_type can be signaled in the slice/tile/brick/sequence/picture-level level/picture-header to determine the coefficient coding method when the cu_transquant_bypass_flag is true. In another example, the residual_coding_type can be signaled in the slice/tile/brick/sequence/picture-level level/picture-header to determine the coefficient coding method regardless whether the cu_transquant_bypass_flag is true or false.

In another embodiment, the residual_coding_type can be signaled/parsed even if the BDPCM mode is used. The non-transform Skip residual coding can be applied when the BDPCM mode is applied. In one example, in either way, the transform is skipped (e.g., no need to signal the MTS (Multiple Transform Selection) syntax). The transform Skip mode flag is only used to select the coefficient coding/parsing method.

In another example, when BDPCM is applied, the residual_coding_type is not applied. The method proposed above can be applied. For example, the BDPCM is coded using transform Skip residual coding, or is coded using regular coefficient coding, or controlled by one or more high-level syntaxes. In another embodiment, the residual_coding_type is only applied for the CU or TU that is not coded in BDPCM mode. In one example, when the residual_coding_type is selected, the selected residual coding method is applied to both the luma and chroma component. In another example, when the residual_coding_type is selected, the selected residual coding method is applied to luma only. The chroma always uses regular coefficient coding.

In one example, the residual_coding_type can be signaled/parsed in TU-level when one or more color components have at least one non-zero coefficient. In another example, the residual_coding_type can be signaled/parsed in TB-level when the current coded color component has at least one non-zero coefficient (e.g., the cbf of the color component or TB equal to 1). In another example, the residual_coding_type can be signaled/parsed in TB-level for the luma component when the current coded luma component has at least one non-zero coefficient. In another example, the residual_coding_type can be signaled/parsed in CU-level when the TU/TBs in the current CU has at least one non-zero coefficient. The residual_coding_type can be signaled after the root_cbf when the root_cbf is not zero. In another example, the residual_coding_type can be signaled/parsed in CU-level when the TU/TBs in the current CU has at least one non-zero coefficient. The residual_coding_type can be signaled after the root_cbf for Inter CU or non-Intra CU (except for the palette mode). The residual_coding_type can be signaled in the TU or TB-level for Intra CU. In another example, the residual_coding_type can be signaled in the first TU or TB-level that has non-zero coefficient for Intra CU. It is only signaled/parsed once in a CU.

In another example, the residual_coding_type can be signaled/parsed in CU-level when the TU/TBs in the current CU has at least one non-zero coefficient. The residual_coding_type can be signaled after the root_cbf when the root_cbf is not zero if the current CU is not Intra coded CU. The residual_coding_type can be signaled at the beginning of residual coding if the current CU is an Intra coded CU. In another example, the residual_coding_type can be signaled/parsed in CU-level when the TU/TBs in the current CU has at least one non-zero coefficient. The residual_coding_type can be signaled after the root_cbf when the root_cbf is not zero if the current CU is not an Intra coded CU and when the lossless mode is applied (e.g., cu_transquant_bypass_flag equal to 1). The residual_coding_type can be signaled at the beginning of residual coding if the current CU is an Intra coded CU and when the lossless mode is applied (e.g., cu_transquant_bypass_flag equal to 1). In one example, when the CU/TU/TB size is larger than the maximum transform Skip TU/TB size, the residual_coding_type is inferred as a regular coefficient coding mode.

In one embodiment, one or more sequence/picture/slice/tile/tile-group/brick/SPS/PPS/VPS/APS-level/picture-header syntaxes of residual_coding_type enabling flag can be signaled/parsed. When the high-level of residual_coding_type enabling flag is enabled, the CU/TU/TB-level residual_coding_type flag/syntax can be signaled/parsed. The high-level of residual coding type enabling flag can be skipped and inferred as disabled when the transform Skip function is not supported (e.g., sps_transform_skip_enabled_flag is false). In another example, one or more sequence/picture/slice/tile/tile-group/brick/SPS/PPS/VPS/AP S-level/picture-header syntaxes of residual_coding_type enabling flag can be signaled/parsed when the lossless mode or the transquant bypass enabled flag is true.

For lossless mode coding, the coefficients are not grouped in the top-right of the TB like the transformed coefficient are, the last significant coefficient position of a TB signaling is not helpful and may degrade the coding efficiency. In one embodiment, when the regular coefficient coding mode is selected or used and the current CU/TU/TB is coded in a lossless mode or tranquant bypass mode, the last significant coefficient position of a TB is not signaled/parsed. When the current CU/TU/TB is not coded in the lossless mode or tranquant bypass mode, the last significant coefficient position of a TB is signaled/parsed. Not signaling the last position can be also applied to BDPCM mode when the BDPCM mode is coded with regular coefficient coding.

When the last significant position is not signaled, the coefficient scan is started from the last scan position of the TB. The coding group significant flag of the last CG (Coefficient Group) is required to be signaled. The significant flag of the last coefficient is required to be signaled if the coding group significant flag of the last CG is not zero. The last position of the TB can be set equal to TB size. The CG starts from the CG containing the scan index of TB size−1.

In another embodiment, the last position can be set to TB size−1, but the significant flag of the last coefficient and/or the significant flag of the last CG needs to be signaled/parsed. The specification changes are as follows, where the changes are shown in Italic.

TABLE 7

|  | Descriptor |
|---|---|
| residual_coding( x0, y0, log2TbWidth, log2TbHeight, cIdx ) {  |  |
| if( ( tu_mts_idx[ x0 ][ y0 ] > 0 \|\|  |  |
| ( cu_sbt_flag && log2TbWidth < 6 && log2TbHeight < 6 ) )  |  |
| && cIdx = = 0 && log2TbWidth > 4 )  |  |
|     log2ZoTbWidth = 4  |  |
| else  |  |
|     log2ZoTbWidth = Min( log2TbWidth, 5 )  |  |
| MaxCcbs = 2 * ( 1 << log2TbWidth ) * ( 1<< log2TbHeight )  |  |
| if( tu_mts_idx[ x0 ][ y0 ] > 0 \|\|  |  |
| ( cu_sbt_flag && log2TbWidth < 6 && log2TbHeight < 6 ) )  |  |
| && cIdx = = 0 && log2TbHeight > 4 )  |  |
|     log2ZoTbHeight = 4  |  |
| else  |  |
|     log2ZoTbHeight = Min( log2TbHeight, 5 )  |  |
| if( log2TbWidth > 0 &&*!cu_transquant_bypass_flag*[ *x0* ][ *y0* ])  |  |
|    last_sig_coeff_x_prefix | ae(v) |
| if( log2TbHeight > 0 &&*!cu_transquant_bypass_flag*[ *x0* ][ *y0* ])  |  |
|    last_sig_coeff_y_prefix | ae(v) |
| if( last_sig_coeff_x_prefix > 3 &&*!cu_transquant_bypass_flag*[ *x0* ][ *y0* ])  |  |
|    last_sig_coeff_x_suffix | ae(v) |
| if( last_sig_coeff_y_prefix > 3 &&*!cu_transquant_bypass_flag*[ *x0* ][ *y0* ])  |  |
|    last_sig_coeff_y_suffix | ae(v) |
| ...  |  |
|   for( i = lastSubBlock; i >= 0; i− − ) {  |  |
|    ...  |  |
|    if( ( ( i < lastSubBlock ) \|\| *cu_transquant_bypass_flag*[ *x0* ][ *y0* ]) && ( i > 0 ) ) {  |  |
|     coded_sub_block_flag[ xS ][ yS ] | ae(v) |
|     inferSbDcSigCoeffFlag = 1  |  |
|    }  |  |
|   }  |  |
|   ...  |  |
|   for( n = firstPosMode0; n >= 0 && remBinsPass1 >= 4; n− − ) {  |  |
|    xC = ( xS << log2SbW ) + DiagScanOrder[ log2SbW ][ log2SbH ][ n ][ 0 ]  |  |
|    yC = ( yS << log2SbH ) + DiagScanOrder[ log2SbW ][ log2SbH ][ n ][ 1 ]  |  |
|    if( coded_sub_block_flag[ xS ][ yS ] && ( n > 0 \|\| !inferSbDcSigCoeffFlag ) &&  |  |
|     ( xC != LastSignificantCoeffX \|\| yC != Last SignificantCoeffY \|\|  |  |
| *cu_transquant_bypass_flag*[ *x0* ][ *y0* ]) ) {  |  |
|     sig_coeff_flag[ xC ][ yC ] | ae(v) |
| ...  |  |
| }  |  |

In the Table 7, last_sig_coeff_x_prefix specifies the prefix of the column position of the last significant coefficient in the scanning order within a transform block. The values of last_sig_coeff_x_prefix shall be in the range of 0 to (log 2ZoTbWidth<<1)−1, inclusive.

When last_sig_coeff_x_prefix is not present, it is inferred as follows.

If cu_transquant_bypass_flag[x0][y0] is equal to 1, it is inferred to be (log 2ZoTbWidth<<1)−1.

Otherwise, it is inferred to be 0.

In the above statement, last_sig_coeff_y_prefix specifies the prefix of the row position of the last significant coefficient in the scanning order within a transform block. The values of last_sig_coeff_y_prefix shall be in the range of 0 to (log 2ZoTbHeight<<1)−1, inclusive.

When last_sig_coeff_y_prefix is not present, it is inferred as follows:

If cu_transquant_bypass_flag[x0][y0] is equal to 1, it is inferred to be (log 2ZoTbHeight<<1)−1.

Otherwise, it is inferred to be 0.

In another embodiment, one or more sequence/picture/slice/tile/tile-group/brick/SPS/PPS/VPS/APS-level/picture-header syntaxes for enabling not signaling the last position for regular coefficient coding can be signaled. The last position of regular coefficient coding is skipped when the high-level enabling flag for indicating not signaling the last position is enabled. In another example, the last position of regular coefficient coding is skipped when the high-level enabling flag indicating not signaling the last position is enabled and the CU/TU/TB is coded in the lossless mode or transquant bypass mode. In one embodiment, the skipping last position signaling can be applied when some conditions are satisfied. The condition can include block size, prediction type, and/or cu_transquant_bypass_flag. In one embodiment, the high-level syntax for indicating not signaling the last position can be signaled when the lossless mode is applied.

In another embodiment, when the high-level residual_coding_type enabling flag is enable, the high-level BDPCM, chroma BDPCM, or Inter BDPCM enabling flag can be signaled or parsed. If the high-level residual_coding_type enabling flag is enabled and the BDPCM/chroma BDPCM/Inter BDPCM enabling flag is enabled, the BDPCM/chroma BDPCM/Inter BDPCM enable flag can be parsed/signaled regardless of the CU size or TU/TB size or maximum transform Skip TU/TB size. It can be applied even when the CU/TU/TB size is larger than maximum transform Skip TU/TB size. In another example, it can be applied when the CU/TU/TB size is smaller than 64.

In one embodiment, when the lossless mode or transquant bypass mode is enabled and the regular coefficient coding method is used, the coefficient can be rotated by 180 degrees (or the reversed scan is applied). In another embodiment, one or more sequence/picture/slice/tile/tile-group/brick/SPS/PPS/VPS/APS-level/picture-header syntaxes are signaled to indicate whether the coefficient rotation is applied to regular coefficient coding. In another embodiment, one or more sequence/picture/slice/tile/tile-group/brick/SPS/PPS/VPS/APS-level/picture-header syntaxes are signaled to indicate whether the coefficient rotation is applied to regular coefficient coding when the CU/TU/TB is coded in lossless mode or transquant bypass mode. In one embodiment, the coefficient rotation is only applied on Intra coded CU/TU/TB. In another embodiment, the coefficient rotation is only applied on the Intra coded CU/TU/TB with size/width/height smaller than a threshold, e.g., 4, 8, or 16.

As mentioned above, the coefficient coding selection (e.g., using transform Skip mode coefficient coding method or using the regular (i.e., non-transform Skip) coefficient coding method) for transform skipped block and/or the luma/chroma BDPCM coded block can be signaled/parsed at the slice header or at the picture header. In one embodiment, the coefficient coding selection for transform skipped block and BDPCM block can be different. For example, a ph_ts_coef_coding_mode_flag and a ph_bdpcm_coef_coding_mode_flag can be signaled at picture header for determining the coefficient coding method for the transform skipped block and BDPCM block. The value of 1 (or 0) means using transform Skip mode coefficient coding method and the value of 0 (or 1) means using the regular (non-transform Skip) coefficient coding method. In another example, these two flags can be slice_ts_coef_coding_mode_flag and slice_bdpcm_coef_coding_mode_flag which are signaled/parsed in slice header.

In another embodiment, for the coefficient coding method for the TS mode, two different flags can be used for luma and chroma components, and signaled/parsed at slice header and/or picture header. For example, a ph_luma_ts_coef_coding_mode_flag and a ph_chroma_ts_coef_coding_mode_flag can be signaled at the picture header for determining the coefficient coding method for luma and chroma transform skipped blocks. In another example, these two flags can be slice_luma_ts_coef_coding_mode_flag and slice_chroma_ts_coef_coding_mode_flag which are signaled/parsed in the slice header.

In another embodiment, for coefficient coding method for BDPCM mode, two different flags can be used for the luma and chroma components, and signaled/parsed at slice header and/or picture header. For example, a ph_luma_bdpcm_coef_coding_mode_flag and a ph_chroma_bdpcm_coef_coding_mode_flag can be signaled at picture header for determining the coefficient coding method for the luma and chroma BDPCM block. In another example, these two flags can be slice_luma_bdpcm_coef_coding_mode_flag and slice_chroma_bdpcm_coef_coding_mode_flag which are signaled/parsed in the slice header.

In another embodiment, for these coefficient coding selection flags, a default_coef_coding_flag can be signaled first at the SPS/PPS/VPS/APS/picture header/slice header. If this flag is true (or false), the above mentioned flags (e.g., flags for TS/BDPCM, for luma/chroma TS/BDPCM) are skipped. The transform skipped coefficient coding method is used for TS and/or BDPCM block. Otherwise (i.e., the default_coef_coding_flag being false (or true)), the above mentioned flags are signaled.

In another embodiment, for these coefficient coding selection flags, a default_coef_coding_flag or ts_coef_coding_for_ts_bdpcm_flag can be signaled first at the SPS/PPS/VPS/APS/picture header/slice header. If this flag is true (or false), the above mentioned flags (e.g., flags for TS/BDPCM, for luma/chroma TS/BDPCM) are skipped. The transform Skip coefficient coding method is used for TS and/or BDPCM block. Otherwise (the default_coef_coding_flag is false (or true)), another refular_coef_coding_flag or regular_coef_coding_for_ts_bdpcm_flag or non_ts_coef_coding_for_ts_bdpcm_flag is signaled/parsed to indicate whether the regular coefficient coding is used for TS and/or BDPCM blocks. If the flag is true (or false), the TS and BDPCM blocks are all using the regular coefficient coding. Otherwise, the above mentioned flags are signaled.

In yet another embodiment, the above mentioned flags can be signaled at SPS, PPS, VPS, or APS. In yet another embodiment, the above mentioned flags can be signaled at SPS, PPS, VPS, or APS first, and can be overridden at picture header and/or slice header. In yet another embodiment, the above mentioned flag can be signaled at SPS, PPS, VPS, or APS first, and one or more syntaxes can be signaled at SPS, PPS, VPS, or APS to indicate whether the signaled data can be overridden at the picture header and/or slice header.

In one example, when a CU with QP smaller than or equal to 4, or when a CU with QP equal to 4, or when the CU doesn't have any non-zero coefficient, and the transform Skip mode is selected, the loop-filter (including DB, SAO, ALF, bi-lateral filter, and/or Hadamard filter) can be disabled. In another example, when a CU with QP smaller than or equal to 4, or when a CU with QP equal to 4, the loop-filter (including DB, SAO, ALF, bi-lateral filter, and/or Hadamard filter) can be disabled.

Any of the foregoing proposed methods can be implemented in encoders and/or decoders. For example, any of the proposed methods can be implemented in a reshape module or a residual scaling/reshape module or lossless coding mode of an encoder, and/or a reshape module or a residual scaling/reshape module or lossless coding mode of a decoder. Alternatively, any of the proposed methods can be implemented as a circuit coupled to the reshape module or the residual scaling/reshape module or lossless coding mode of the encoder and/or the reshape module or the residual scaling/reshape module or lossless coding mode of the decoder, so as to provide the information needed by the reshape module or the residual scaling/reshape module or lossless coding mode.

Video encoders have to follow the foregoing syntax design so as to generate the legal bitstream, and video decoders are able to decode the bitstream correctly only if the parsing process is complied with the foregoing syntax design. When the syntax is skipped in the bitstream, encoders and decoders should set the syntax value as the inferred value to guarantee the encoding and decoding results are matched.

Figure 1:
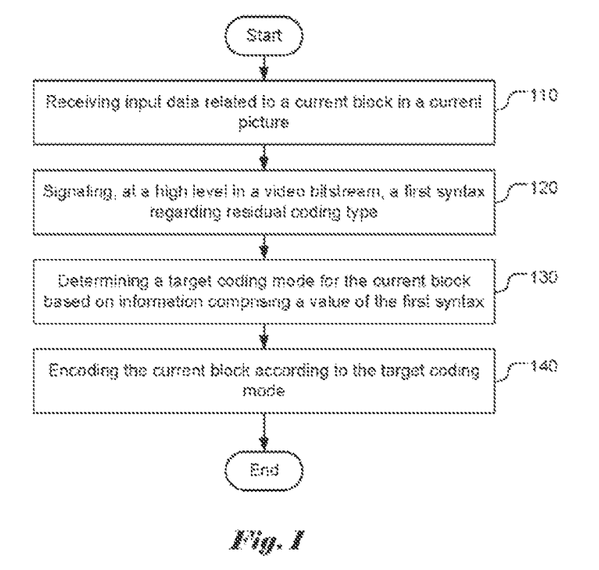
FIG. 1 illustrates a flowchart of an exemplary video encoding according to an embodiment of the present invention, where a syntax is signaled to indicate whether transform skip coefficient coding or regular coefficient coding is used.

FIG. 1 illustrates a flowchart of an exemplary video encoding according to an embodiment of the present invention, where a syntax is signaled to indicate whether transform skip coefficient coding or regular coefficient coding is used. The steps shown in the flowchart, as well as other following flowcharts in this disclosure, may be implemented as program codes executable on one or more processors (e.g., one or more CPUs) at the encoder side and/or the decoder side. The steps shown in the flowchart may also be implemented based hardware such as one or more electronic devices or processors arranged to perform the steps in the flowchart. According to this method, input data related to a current block in a current picture are received in step 110. A first syntax regarding residual coding type is signaled at a high level in a video bitstream in step 120. A target coding mode is determined for the current block based on information comprising a value of the first syntax in step 130. The current block is encoded according to the target coding mode in step 140.

Figure 2:
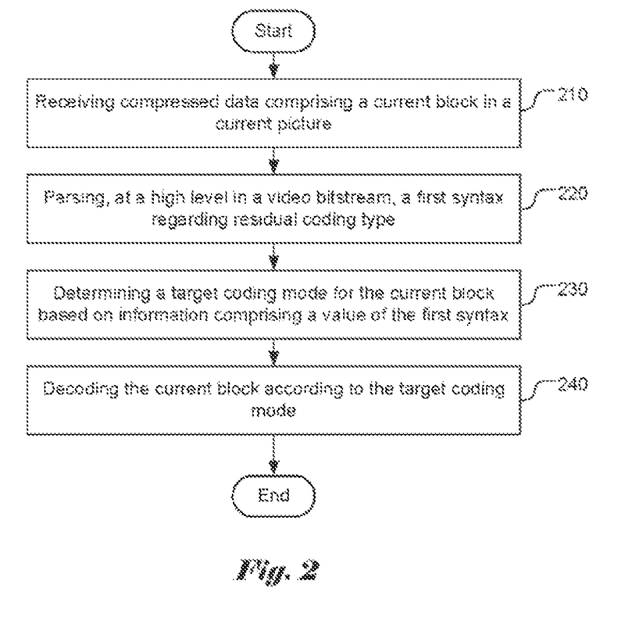
FIG. 2 illustrates a flowchart of an exemplary video decoding according to an embodiment of the present invention, where a syntax is parsed to indicate whether transform skip coefficient coding or regular coefficient coding is used.

FIG. 2 illustrates a flowchart of an exemplary video decoding according to an embodiment of the present invention, where a syntax is parsed to indicate whether transform skip coefficient coding or regular coefficient coding is used. According to this method, compressed data comprising a current block in a current picture are received in step 210. A first syntax regarding residual coding type is parsed at a high level in a video bitstream in step 220. A target coding mode is determined for the current block based on information comprising a value of the first syntax in step 230. The current block is decoded according to the target coding mode in step 240.

The flowcharts shown are intended to illustrate examples of video coding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more circuit circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of video encoding, the method comprising:
receiving input data related to a current block in a current picture;
signaling, at a high level in a video bitstream, a first syntax regarding residual coding type;
determining a residual coding type of a block that is coded with transform skip mode or DPCM mode;
in response to the current block is coded with transform skip mode or DPCM mode,
encoding the current block by using the residual coding type indicated in the first syntax, wherein the residual coding type of a block that is not coded in the transform skip mode or DPCM mode remain unchanged regardless of the first syntax value.

2. The method of claim 1, wherein the high level corresponds to a slice header or a picture header.

3. The method of claim 1, wherein the first syntax indicates the residual coding type of transform skip blocks or the residual coding type of DPCM blocks.

4. The method of claim 3, wherein the residual coding type is transform skip coefficient coding or regular coefficient coding, and the first syntax indicates whether transform skip coefficient coding or regular coefficient coding is used.

5. The method of claim 3, wherein the first syntax comprises two independent residual coding type flags for a luma component and a chroma component, respectively.

6. The method of claim 1, wherein while the first syntax is signaled to indicate residual coding type of transform skip blocks, a separate syntax is signaled to indicate residual coding type of DPCM blocks.

7. An apparatus of video encoding, the apparatus of video encoding comprising one or more electronic circuits or processors arranged to:
- receive input data related to a current block in a current picture;
- signal, at a high level in a video bitstream, a first syntax regarding residual coding type;
- determine, independent of whether a lossless mode is applied or not, a target coding mode for the current block based on information comprising a value of the first syntax, wherein the first syntax is signaled regardless of a second syntax indicating transform skip coefficient coding mode being true or false, the second syntax being signaled for the current block; and
- encode the current block according to the target coding mode.

8. A method of video decoding, the method comprising:
- receiving compressed data comprising a current block in a current picture;
- parsing, at a high level in a video bitstream, a first syntax regarding residual coding type;
- determining a residual coding type of a block that is coded with transform skip mode or DPCM mode;
- in response to the current block is coded with transform skip mode or DPCM mode,
  - decoding the current block by using the residual coding type indicated in the first syntax, wherein the residual coding type of a block that is not coded in the transform skip mode or DPCM mode remain unchanged regardless of the first syntax value.

9. The method of claim 8, wherein the high level corresponds to a slice header or a picture header.

10. The method of claim 8, wherein the first syntax indicates the residual coding type of transform skip blocks or the residual coding type of DPCM blocks.

11. The method of claim 10, wherein the residual coding type is transform skip coefficient coding or regular coefficient coding.

12. The method of claim 8, wherein the first syntax indicates whether transform skip coefficient coding or Block DPCM or regular coefficient coding is used.

13. The method of claim 8, wherein the first syntax is parsed to indicate whether the residual coding type is of transform skip coefficient coding, and a separate syntax is parsed to indicate whether Block DPCM or regular coefficient coding is used.

14. An apparatus of video decoding, the apparatus of video decoding comprising one or more electronic circuits or processors arranged to:
- receive compressed data comprising a current block in a current picture;
- parse, at a high level in a video bitstream, a first syntax regarding residual coding type;
- determine a residual coding type of a block that is coded with transform skip mode or DPCM mode and
- in response to the current block is coded with transform skip mode or DPCM mode, decode the current block by using the residual coding type indicated in the first syntax, wherein the residual coding type of a block that is not coded in the transform skip mode or DPCM mode remain unchanged regardless of the first syntax value.

* * * * *